(12) United States Patent
Louie et al.

(10) Patent No.: US 7,599,879 B2
(45) Date of Patent: Oct. 6, 2009

(54) SYNDICATION LOAN ADMINISTRATION AND PROCESSING SYSTEM

(75) Inventors: Edmund H. Louie, Searingtown, NY (US); Michael X. Campbell, Parlin, NJ (US)

(73) Assignee: JPMorgan Chase Bank, National Association, New York, NY (US)

( * ) Notice: Subject to any disclaimer, the term of this patent is extended or adjusted under 35 U.S.C. 154(b) by 1309 days.

(21) Appl. No.: 09/814,243

(22) Filed: Mar. 21, 2001

(65) Prior Publication Data

US 2001/0054022 A1      Dec. 20, 2001

Related U.S. Application Data

(60) Provisional application No. 60/192,098, filed on Mar. 24, 2000.

(51) Int. Cl.
*G06Q 40/00* (2006.01)
(52) U.S. Cl. .................... 705/37; 705/38; 705/36 R; 709/229
(58) Field of Classification Search ............ 705/36 R, 705/37, 38; 709/229
See application file for complete search history.

(56) References Cited

U.S. PATENT DOCUMENTS

| | | | |
|---|---|---|---|
| 3,316,395 | A | 4/1967 | Lavin |
| 3,634,669 | A | 1/1972 | Soumas et al. |
| 4,254,474 | A | 3/1981 | Cooper et al. |
| 4,594,663 | A | 6/1986 | Hirayama |
| 4,598,367 | A | 7/1986 | DeFrancesco et al. |
| 4,642,768 | A | 2/1987 | Roberts |
| 4,736,294 | A | 4/1988 | Le Grand |
| 4,739,478 | A | 4/1988 | Roberts et al. |
| 4,760,604 | A | 7/1988 | Cooper et al. |
| 4,812,628 | A | 3/1989 | Boston |
| 4,831,526 | A | 5/1989 | Luchs |
| 4,866,634 | A | 9/1989 | Reboh |

(Continued)

FOREIGN PATENT DOCUMENTS

WO    WO 02/03226    1/2002

OTHER PUBLICATIONS

Tebbe, Mark "If bankers can use the Internet to make big bucks, why can't you? (Between the lines)" Sep. 29, 1997, InfoWorld V19, N39, p. 152).*

(Continued)

*Primary Examiner*—Hani Kazimi
*Assistant Examiner*—Olabode Akintola
(74) *Attorney, Agent, or Firm*—Goodwin Procter LLP

(57) ABSTRACT

A loan syndication tracking and management system and method provides a user with access to specific details related to a syndicated loan. The system and method coordinates investor, borrower and resource information, in addition to features related to the overall structure of a syndicated loan. Users access the system with various levels of permissions to view, add, update or delete information according to their allotted permissions. The system permits multiple users to access the information for efficient handling of approvals and requests related to multiple investors and borrowers, in addition to handling institution interchanges and notifications. The system and method keeps a record of all transactions and changes for review, reporting or regulatory purposes. The administration of a syndicated loan transaction is simplified while providing advanced features such as support for loan trading.

11 Claims, 5 Drawing Sheets

U.S. PATENT DOCUMENTS

| | | | |
|---|---|---|---|
| 4,897,811 A | 1/1990 | Scofield | |
| 4,914,587 A | 4/1990 | Clouse | |
| 4,953,085 A * | 8/1990 | Atkins | 705/36 R |
| 4,964,043 A | 10/1990 | Galvin | |
| 5,054,096 A | 10/1991 | Beizer | |
| 5,206,803 A | 4/1993 | Vitagliano | |
| 5,220,500 A | 6/1993 | Baird et al. | |
| 5,227,874 A | 7/1993 | Von Kohorn | |
| 5,231,571 A | 7/1993 | D'Agostino | |
| 5,239,462 A | 8/1993 | Jones | |
| 5,262,941 A | 11/1993 | Saladin | |
| 5,274,547 A | 12/1993 | Zoffel | |
| 5,278,751 A | 1/1994 | Adiano et al. | |
| 5,321,841 A | 6/1994 | East et al. | |
| 5,424,938 A | 6/1995 | Wagner | |
| 5,444,844 A | 8/1995 | Inoue et al. | |
| 5,481,647 A | 1/1996 | Brody et al. | |
| 5,523,942 A | 6/1996 | Tyler et al. | |
| 5,537,315 A | 7/1996 | Mitcham | |
| 5,550,734 A | 8/1996 | Tater | |
| 5,551,021 A | 8/1996 | Harada et al. | |
| 5,606,496 A | 2/1997 | D'Agostino | |
| 5,611,052 A | 3/1997 | Dykstra | |
| 5,644,493 A | 7/1997 | Motai et al. | |
| 5,649,116 A | 7/1997 | McCoy et al. | |
| 5,655,085 A | 8/1997 | Ryan | |
| 5,664,115 A | 9/1997 | Fraser | |
| 5,689,649 A | 11/1997 | Altman et al. | |
| 5,689,650 A * | 11/1997 | McClelland et al. | 705/36 R |
| 5,696,907 A | 12/1997 | Tom | |
| 5,699,527 A | 12/1997 | Davidson | |
| 5,701,400 A | 12/1997 | Amado | |
| 5,715,402 A | 2/1998 | Popolo | |
| 5,717,865 A | 2/1998 | Stratmann | |
| 5,732,397 A | 3/1998 | DeTore et al. | |
| 5,742,775 A | 4/1998 | King | |
| 5,758,328 A | 5/1998 | Giovannoli | |
| 5,765,144 A | 6/1998 | Larche | |
| 5,774,882 A | 6/1998 | Keen | |
| 5,774,883 A | 6/1998 | Andersen et al. | |
| 5,794,207 A | 8/1998 | Walker et al. | |
| 5,797,133 A | 8/1998 | Jones | |
| 5,802,502 A | 9/1998 | Gell et al. | |
| 5,809,478 A | 9/1998 | Greco | |
| 5,815,683 A | 9/1998 | Vogler | |
| 5,832,447 A | 11/1998 | Rieker et al. | |
| 5,838,906 A | 11/1998 | Doyle et al. | |
| 5,842,178 A | 11/1998 | Giovannoli | |
| 5,844,553 A | 12/1998 | Hao et al. | |
| 5,845,256 A | 12/1998 | Pescitelli | |
| 5,848,427 A | 12/1998 | Hyodo | |
| 5,862,223 A | 1/1999 | Walker et al. | |
| 5,870,721 A | 2/1999 | Norris | |
| 5,870,723 A | 2/1999 | Pare | |
| 5,873,096 A | 2/1999 | Lim | |
| 5,920,848 A | 7/1999 | Schutzer et al. | |
| 5,926,800 A | 7/1999 | Baronowski | |
| 5,930,764 A | 7/1999 | Melchione | |
| 5,930,775 A | 7/1999 | McCauley et al. | |
| 5,930,776 A | 7/1999 | Dykstra | |
| 5,940,811 A * | 8/1999 | Norris | 705/38 |
| 5,940,812 A * | 8/1999 | Tengel et al. | 705/38 |
| 5,963,953 A | 10/1999 | Cram et al. | |
| 5,966,699 A | 10/1999 | Zandi | |
| 5,970,482 A | 10/1999 | Pham | |
| 5,970,483 A | 10/1999 | Evans | |
| 5,983,206 A | 11/1999 | Oppenheimer | |
| 5,987,434 A | 11/1999 | Libman | |
| 5,987,436 A | 11/1999 | Halbrook | |
| 5,991,750 A | 11/1999 | Watson | |
| 5,995,947 A | 11/1999 | Fraser | |
| 6,012,044 A | 1/2000 | Maggioncalda et al. | |
| 6,014,645 A | 1/2000 | Cunningham | |
| 6,014,646 A | 1/2000 | Vallee et al. | |
| 6,029,149 A | 2/2000 | Dykstra | |
| 6,032,137 A | 2/2000 | Ballard | |
| 6,055,517 A | 4/2000 | Friend et al. | |
| 6,078,905 A | 6/2000 | Pich-Le Winter | |
| 6,088,686 A | 7/2000 | Walker et al. | |
| 6,105,007 A | 8/2000 | Norris | |
| 6,108,644 A | 8/2000 | Goldschlag et al. | |
| 6,112,190 A | 8/2000 | Fletcher et al. | |
| 6,128,603 A | 10/2000 | Dent et al. | |
| 6,134,530 A | 10/2000 | Bunting et al. | |
| 6,134,591 A * | 10/2000 | Nickles | 709/229 |
| 6,167,383 A | 12/2000 | Henson | |
| 6,185,543 B1 | 2/2001 | Galperin et al. | |
| 6,208,979 B1 | 3/2001 | Sinclair | |
| 6,216,115 B1 | 4/2001 | Barrameda et al. | |
| 6,233,566 B1 * | 5/2001 | Levine et al. | 705/36 R |
| 6,249,775 B1 * | 6/2001 | Freeman et al. | 705/36 R |
| 6,260,026 B1 | 7/2001 | Tomida et al. | |
| 6,272,528 B1 | 8/2001 | Cullen et al. | |
| 6,311,169 B2 | 10/2001 | Duhon | |
| 6,324,524 B1 | 11/2001 | Lent et al. | |
| 6,339,766 B1 | 1/2002 | Gephardt | |
| 6,343,279 B1 | 1/2002 | Bissonette et al. | |
| 6,374,230 B1 | 4/2002 | Walker et al. | |
| 6,385,594 B1 * | 5/2002 | Lebda et al. | 705/38 |
| 6,405,181 B2 | 6/2002 | Lent et al. | |
| 6,484,153 B1 * | 11/2002 | Walker et al. | 705/38 |
| 6,502,080 B1 | 12/2002 | Eichorst et al. | |
| 6,529,187 B1 | 3/2003 | Dickelman | |
| 6,556,979 B1 | 4/2003 | Liu et al. | |
| 6,567,791 B2 | 5/2003 | Lent et al. | |
| 6,578,761 B1 | 6/2003 | Spector | |
| 6,601,034 B1 | 7/2003 | Honarvar et al. | |
| 6,691,094 B1 * | 2/2004 | Herschkorn | 705/37 |
| 6,805,287 B2 | 10/2004 | Bishop | |
| 6,898,636 B1 * | 5/2005 | Adams et al. | 709/229 |
| 2001/0011255 A1 | 8/2001 | Asay et al. | |
| 2001/0037289 A1 | 11/2001 | Mayr et al. | |
| 2001/0047313 A1 | 11/2001 | Kanai | |
| 2001/0047489 A1 | 11/2001 | Ito et al. | |
| 2002/0007341 A1 | 1/2002 | Lent et al. | |
| 2002/0013728 A1 | 1/2002 | Wilkman | |
| 2002/0032645 A1 | 3/2002 | Nozaki et al. | |
| 2002/0038363 A1 | 3/2002 | MacLean | |
| 2002/0048369 A1 | 4/2002 | Ginter et al. | |
| 2002/0052833 A1 | 5/2002 | Lent et al. | |
| 2002/0052836 A1 | 5/2002 | Galperin et al. | |
| 2002/0052842 A1 | 5/2002 | Schuba et al. | |
| 2002/0062285 A1 | 5/2002 | Amann et al. | |
| 2002/0069159 A1 | 6/2002 | Talbot et al. | |
| 2002/0087468 A1 | 7/2002 | Ganesan et al. | |
| 2002/0091628 A1 | 7/2002 | Kunimatsu | |
| 2002/0091635 A1 | 7/2002 | Dilip et al. | |
| 2002/0103749 A1 | 8/2002 | Agudo et al. | |
| 2002/0123960 A1 | 9/2002 | Ericksen | |
| 2002/0188556 A1 | 12/2002 | Colica et al. | |
| 2003/0004866 A1 | 1/2003 | Huennekens et al. | |
| 2003/0046222 A1 | 3/2003 | Bard et al. | |
| 2003/0046223 A1 | 3/2003 | Crawford et al. | |
| 2003/0101133 A1 | 5/2003 | DeFrancesco, Jr. et al. | |
| 2003/0120586 A1 | 6/2003 | Litty | |
| 2003/0135448 A1 | 7/2003 | Aguias et al. | |
| 2003/0135449 A1 | 7/2003 | Xu et al. | |
| 2003/0135450 A1 | 7/2003 | Aguais et al. | |
| 2003/0140000 A1 | 7/2003 | Lee | |
| 2003/0176931 A1 | 9/2003 | Pednault et al. | |
| 2003/0195840 A1 | 10/2003 | Xu | |
| 2003/0229582 A1 | 12/2003 | Sherman et al. | |
| 2004/0044615 A1 | 3/2004 | Xue et al. | |

2005/0097036 A1    5/2005    White et al.

OTHER PUBLICATIONS

Tebbe, mark "If bankers can use the Internet to make big bucks, why can't you? (Between the line)" Sep. 29, 1997, InfoWorld V19, N39, p. 152.*
CFO Alert "New medium brewing for syndications" Mar. 23, 1998, V5, N121 ISSN: 0894-4822.*
Case Study: Lending "Bank of America Taps the Web In Handling Loan Syndications" Bank System Apr. 1998.*
"Cyber street", Wall Street and Technology, New York, Jun. 1997.*
Corporate EFT Report "Internet promises lower cost loan syndications IntraLink replaces paper with online access" Nov. 12, 1997, V17, IS21, Phillips Business Information.*
CFO Alert "New medium brewing for syndications" Mar. 23, 1998,V5, N121 ISSN: 0894-4822.*
Rutter, J., "Deals in Cyberspace", Euromoney, London, Feb. 1998.*
"Cyber street", Wall Street and Technology, New York, Jun. 1997.*
Corporate EFT Report "Internet promises lower cost loan syndications IntraLink replaces paper with online access" Nov. 12,1997, V17, IS21, Phillips Business Information.*
Hickman et al., An Evolutionary Leap in Credit Portfolio Risk Modeling, Dec. 18, 2002.
Automated Capture for Forms & Documents, Cardiff Teleform Elite, copyright 1991-2000.
Anonymous, Car Loans in Minutes, Bank Management, vol. 64, No. 4 Apr. 1, 1993.
Credit Line Optimization, A Marketswitch Paper, Marketswitch Corporation, www.marketswitch.com, copyright 2002, 6 pages.
Credit Score Accuracy and Implications for Consumers, Consumer Federation of America National Credit Rep, Dec. 17, 2002.
Fast Start Scoring Models, Scorex, http://www.Scores.com/us/home.html, copyright 2003, Jun. 25, 2005.
Banasiak, Integrating Predictive Scoring Technology, $12^{th}$ Annual Credit Card Collections Conference, Oct. 15-Oct. 17, 2003.
NAESB-SUIS Creditworthiness Principles Draft #1, NAESB-SUIS, Dec. 9, 2002.
Hubbard et al., NextGen FICO Scores: More Predictive Power in Account Management, A Fair Isaac Paper, Sep. 1, 2001.
Scorex Launches New Credit Line Optimization Consulting Service, Sorex, Press Release, Oct. 27, 2003.
Strategy Science Executive Brief, Fair Isaac, copyright Jun. 2003.
Triad Adaptive Control System—Version 7, Fair Isaac, copyright 2003, Jun. 25, 2005.
Paradi et al., Using DEA and Negative DEA in Credit Risk Evaluation, Journal of Productivity Analysis, vol. 21, 2004, pp. 153-165.
International Search Report dated Jul. 13, 2001 for corresponding PCT Application No. PCT/US01/09466.

* cited by examiner

Fig. 3

SYNDICATION LOAN ADMINISTRATION AND PROCESSING SYSTEM

This application is based upon and claims benefit of U.S. provisional application 60/192,098, filed Mar. 24, 2000, to which a claim of priority is made.

BACKGROUND OF THE INVENTION

1. Field of the Invention

The present invention relates to a syndication loan management and administration system for tracking information related to a syndicated loan. More particularly, the present invention relates to a multiuser system for accessing and manipulating data related to a syndicated loan, including investor, borrower and institution information.

2. Description of the Prior Art

Financing of a large commercial endeavor typically requires leveraging a large amount of financial resources to support creation of a commercial entity. A planned commercial endeavor will typically involve a number of individuals responsible for initiating and managing the endeavor through its various phases, including inception of the commercial entity. These individuals will typically seek debt based financing, such as commercial loans, to support the initial development of the commercial enterprise. The types of commercial loans needed are typically large and require a significant amount of resources to properly complete the funding transaction. For example, if individuals representing the entity approach a large commercial bank for a commercial loan, the bank generally needs to obtain proper assurances from the borrowers before money can be loaned. Such assurances could include items such as collateral, loan insurance or the like. In addition, the commercial bank must organize resources sufficient to meet the needs of the borrowers and structure the loan in a way which meets the needs of the borrowers.

Lending institutions such as commercial banks typically have limits to the amounts of funds they wish to commit to any one commercial undertaking. These loan limits are often less than the total amount of financing a commercial undertaking requires to initiate an enterprise. By organizing a number of banks or lenders to finance the undertaking, the required funds can be obtained while limiting the exposure of individual lending institutions. One way of organizing a group of banks or lenders is to form a loan syndicate which has as members a number of commercial lending institutions. The loan syndicate can underwrite large commercial loans, while spreading risk and liability among the various members to lessen the impact of any risk associated with the large commercial loan.

A syndicated loan involving a number of lending institutions involves the handling of a large amount of data related to various aspects of the syndicated loan. For example, the loan resources to be used, or facilities, typically need to be tracked and evaluated for availability, amounts available, future demands on the facility and so forth. Information related to the members of the syndicate group, or investors, also needs to be tracked and updated as a loan evolves. Activity related to the borrowers such as payment amounts, expected dates of payments and so forth must also be tracked. In addition, details related to regulatory requirements must be tracked and reported to appropriate authorities, such as required tax payments.

A syndicate manager is typically one of the lending institutions in a syndicated loan group, that carries the administrative burden of managing the syndicate loan over its lifetime. The manager, or agent, will usually be paid fees out of the loan transaction to offset the administrative burden, which can be significant. The agent has extensive duties before and after closing a syndicated loan deal, many of which include regulatory reporting requirements.

As a syndicated loan is completed, an opportunity for loan trading is presented among the various lenders holding loan assets during the lifetime of the syndicated loan. Loan trading presents a further administrative burden on the syndicate manager, which must track changes in ownership.

An institution that wishes to become a syndicate manager will usually endeavor to attract potential lenders and evaluate the interests of borrowers to provide an attractive package for the two parties. Success in becoming a syndicate manager often depends on adroitly organizing contact information to facilitate a market monitoring process between lenders and borrowers.

Once a borrower sets a desired funding amount, and a potential syndicate manager begins soliciting lenders for organizing a loan syndicate, proposals need to be organized and shared with all potential lenders. A typical proposal includes voluminous legal documents that a manager must ensure specify all the proper terms and conditions of the loan agreement.

After a syndicate loan has closed, the manager acts as the administrator between lenders and borrowers, and provide funding updates and notifications as agreed. Typically, a number of lenders are involved with the updates and notifications, requiring the syndicate loan manager to expend a number of resources providing paper notification by courier or facsimile at given intervals or on agreed dates. As the loan matures, further functionality is desirable, such as sharing data with other systems, analyzing loan parameters and providing further access and integration with desktop type systems.

Syndicate loan managers typically find it difficult to assemble a group of banks to collaborate on a single credit transaction. Once a group of lenders is assembled, it is further challenging to coordinate the group during the lifetime of the loan. The present market for syndicated loans demands greater sophistication and complexity, in addition to more capability and flexibility, than any present system can provide.

It would be advantageous to any syndicate loan manager to have a tool to efficiently handle the demands of loan administration, while providing functionality for new possibilities of communication, including the Internet, in a single package. Presently, there is no known system that can deliver the needed functionality in a complete and efficient manner in a single package to handle the complexities and sophistication of these types of deals in their present form. Accordingly, there is a need for a multi-user sophisticated syndicated loan management system which has high reliability, efficiency and accessibility.

SUMMARY OF THE INVENTION

It is an object of the present invention to provide a system and method for syndicate loan management and processing which overcomes the drawbacks of the prior art.

Briefly stated, there is provided according to the present invention a loan syndication tracking and management system and method that provides a user with access to specific details related to a syndicated loan. The system and method coordinates investor, borrower and resource information, in addition to features related to the overall structure of a syndicated loan. Users access the system with various levels of permissions to view, add, update or delete information according to their allotted permissions. The system permits multiple users to access the information for efficient handling of approvals and requests related to multiple investors and borrowers, in addition to handling institution interchanges. The system and method keeps a record of all transactions and changes for review, auditing, reporting or regulatory purposes. The structure of a syndicated loan transaction is simplified, and the transactions can be made with greater efficiency and ease.

According to an embodiment of the present invention, there is provided a loan management system comprising a first dataset related to a plurality of lenders, a second dataset related to at least one borrower and a third dataset related to a plurality of loan resources. A processing engine can access and manipulate the datasets, while a user interface permits a user to access and provide commands to the processing engine. The commands provided by the user permits access and manipulation of the datasets. The datasets can be manipulated to record and track information related to a loan composed of at least a portion of the plurality of loan resources provided by the plurality of lenders to at least one borrower.

The lenders, or investors, have access to a number of financial resources, such as negotiable instruments, promissory notes and the like, suitable for allocation to a borrower loan. A financial resource is typically referred to as a facility. Each investor can contribute a share of the loan resources, for example a pro-rata share, in addition to absorbing a portion of the liability and tax burdens of the loan. Each investor similarly receives a share of the proceeds of the loan repayment. Typically, there is one investor that acts as the lead lender for the deal, generally providing a larger proportion of the loan funding. The system and method according to the present invention permits a lead lender, for example, to track the assets of the loan, payment schedules, pro-rata shares in the loan of all the participating investors, contacts for the various investors and borrowers and generate reports for distribution among the various members of the transaction.

BRIEF DESCRIPTION OF THE DRAWINGS

The above, and other objects, features and advantages of the present invention will become apparent from the following description read in conjunction with the accompanying drawings, in which:

FIG. 3 is a typical user interface screen for accessing the system according to the present invention;

DETAILED DESCRIPTION OF THE PREFERRED EMBODIMENTS

Figure 1:
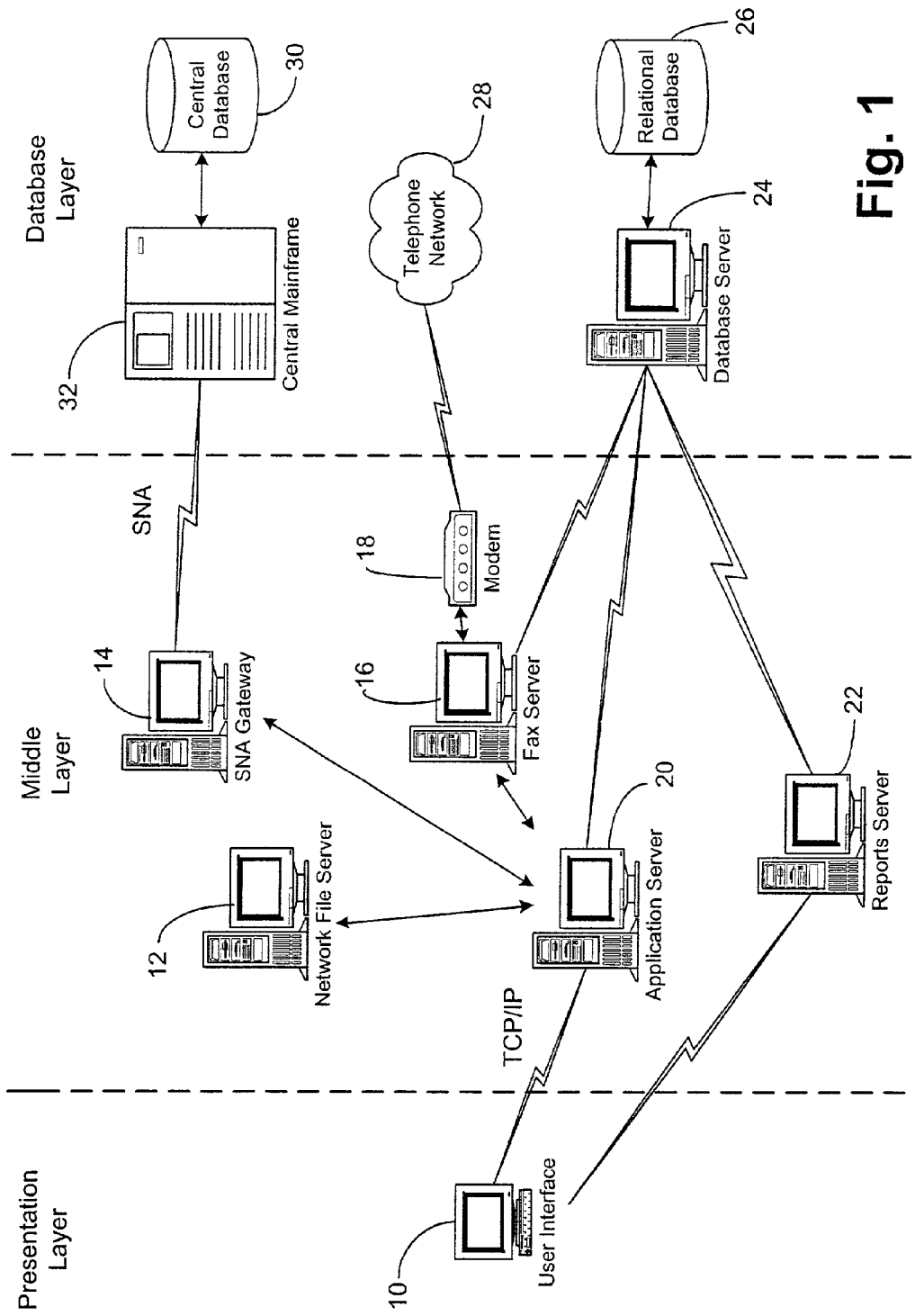
FIG. 1 is a diagram showing the interconnectivity of system components according to the present invention.

Referring now to FIG. 1, a diagram of system interconnectivity with various layers is shown. A presentation layer includes client machines, while a middle layer represents local area network access and communication ports. A database layer includes mass storage devices and database processing engines for accessing data stored in the mass storage devices.

An individual user typically accesses the system shown in FIG. 1 through a user interface 10. User interface 10 is preferably connected to an application server 20 and a reports server 22, each of which are accessible by the user. Application server 20 preferably has access to a number of resources including a network file server 12, an SNA gateway 14 and a fax server 16. Network file server 12 hosts network accessible files and has a large number of resources available to the LAN (Local Area Network) comprising the middle layer indicated in FIG. 1. SNA gateway 14 provides access to central mainframe 32 for application server 20 over a connection through SNA gateway 14. Fax server 16 controls a modem 18, and is capable of sending facsimile correspondence automatically over a telephone network 28.

The database layer contains large scale databases and database processing engines. Central mainframe 32 can access a central database 30, and provide application server 20 with database information through SNA gateway 14. In addition, database server 24 has access to a relational database 26, the contents of which is also available to application server 20. Telephone network 28 is indicated as being included in the database layer to show that fax server 16 has access to a large number of systems through modem 18 by which correspondence can be easily distributed on a large scale automatically.

Figure 2:
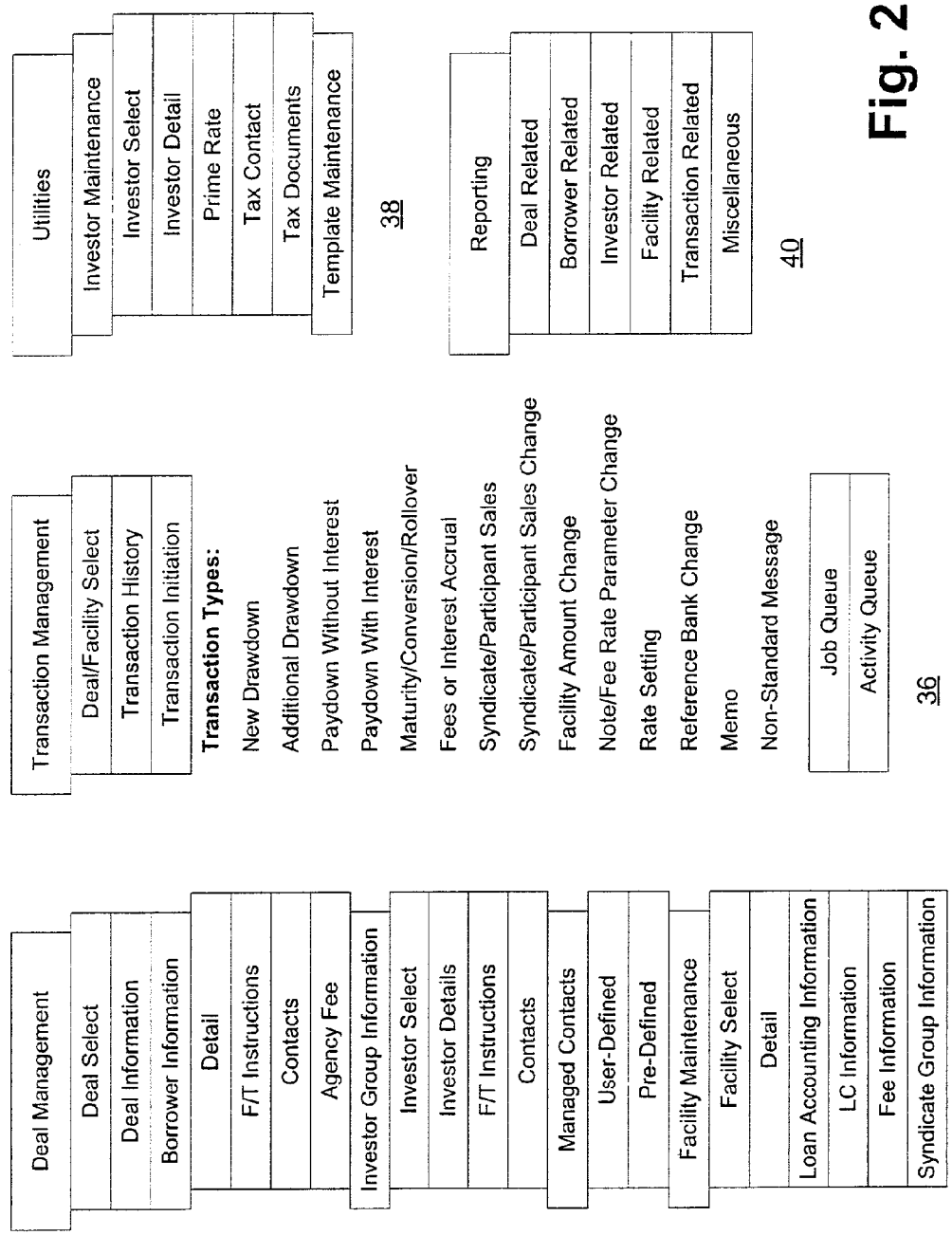
FIG. 2 is an illustration of a menu system according to the present invention.

Referring now to FIG. 2, a menu system according to an embodiment of the present invention is shown. The menu system is preferably available to a user at the presentation layer through user interface 10, for example. Top level menu items include a deal management menu 34, a transaction management menu 36, a utilities menu 38 and a reporting menu 40. Each menu is referred to with regard to its respective components in the following description.

Figure 3:
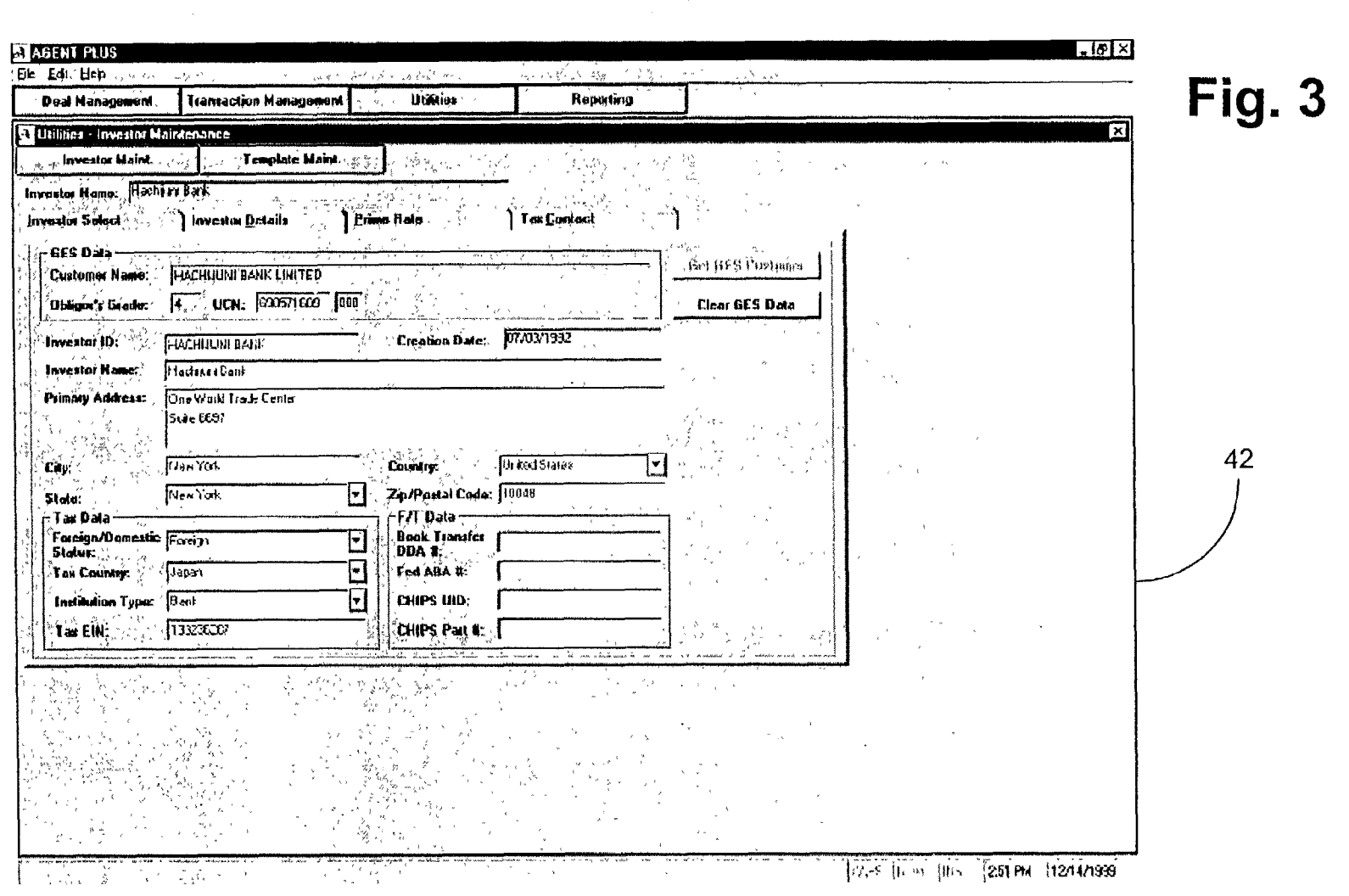

Referring now to FIG. 3, a typical system display screen 42 is shown. A number of users interact with the system through display interfaces similar to that of display screen 42. User activities include manipulation of data in central database 30 or relational database 26. Users can be presented with information for approval, can read or modify database information or output reports for distribution. For example, FIG. 3 shows detail information of a typical investor, where the investor is a financial institution.

Figure 4:
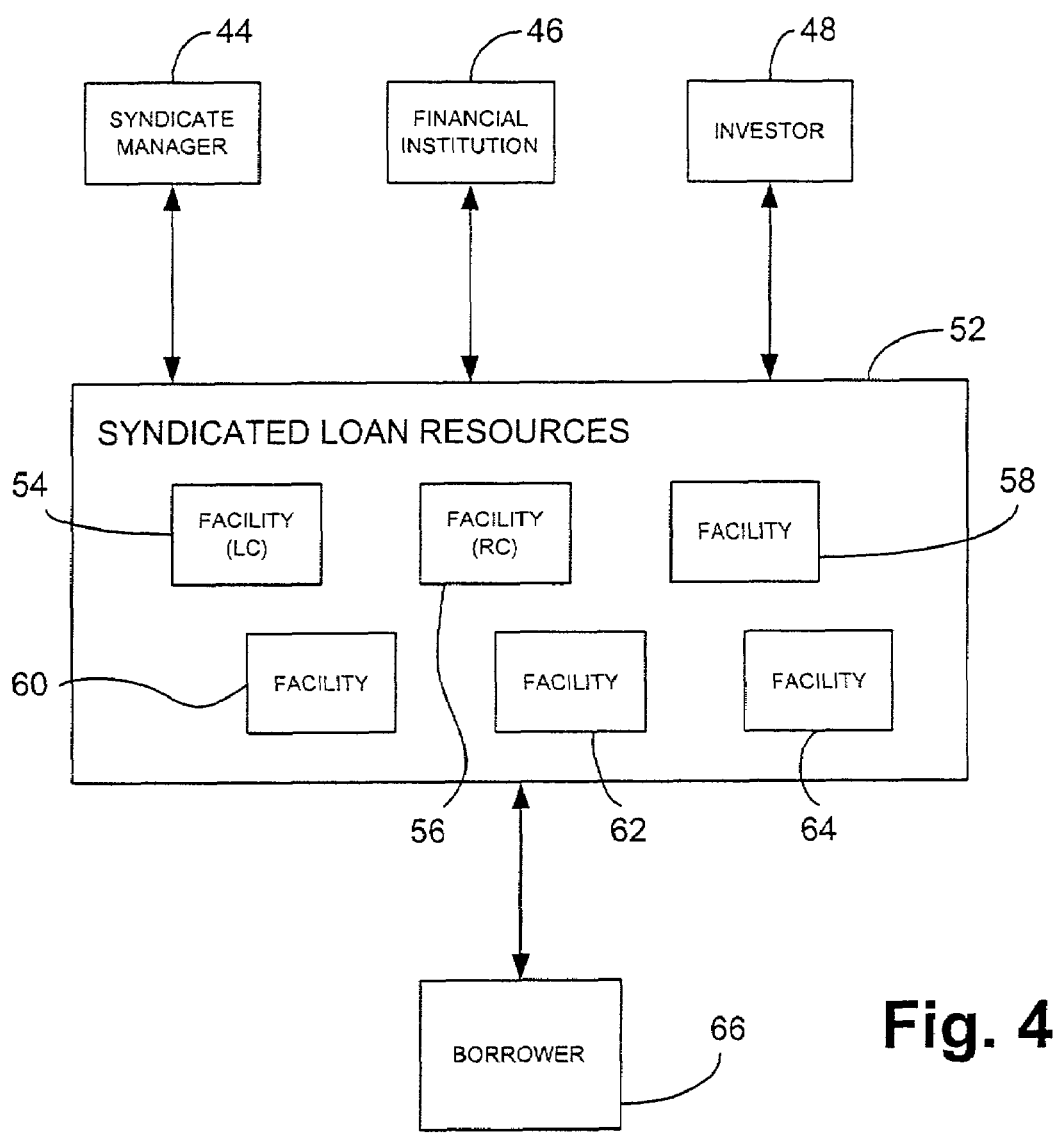
FIG. 4 is an illustration of interaction between components according to the present invention.

Referring now to FIG. 4, a simple illustration of the entities involved in the syndicate loan is provided. A syndicate manager 44, a number of investors 48 including financial institution 46 and a borrower 66 all contribute or use syndicated loan resources 52. Syndicate manager 44 represents a financial institution responsible for organizing syndicated loans and contributing to syndicated loan resources 52. Investors 48 can be made up of loan resource contributors or loan providers, such as other financial institutions 46. Borrower 66 is an entity that receives the benefit of syndicated loan resources 52. Syndicated loan resources 52 includes loan facilities 54, 56, 58, 60, 62 and 64. Loan facility 54, for example, can be a negotiable instrument, an LC (Letter of Credit), promissory note, or the like. The various resource contributors supply the various loan facilities to syndicated loan resources 52. Typically, the financial institution that acts as syndicate manager 44 contributes the majority of resources to the total of syndicated loan resources 52.

Management and administration of facility resources comprises the bulk of syndicate loan management activity. Each of facilities 54, 56, 58, 60, 62 and 64 may be different types of financial instruments. Some types of instruments include LC, debt purchases, promissory notes and so forth. Transactions applied against the various facilities also vary considerably depending on the facility. Each transaction can also have various pricing types related to execution of the transaction. The various transactions listed in transaction management menu 36 and associated pricing types are discussed below in the context of transaction management.

Figure 5:
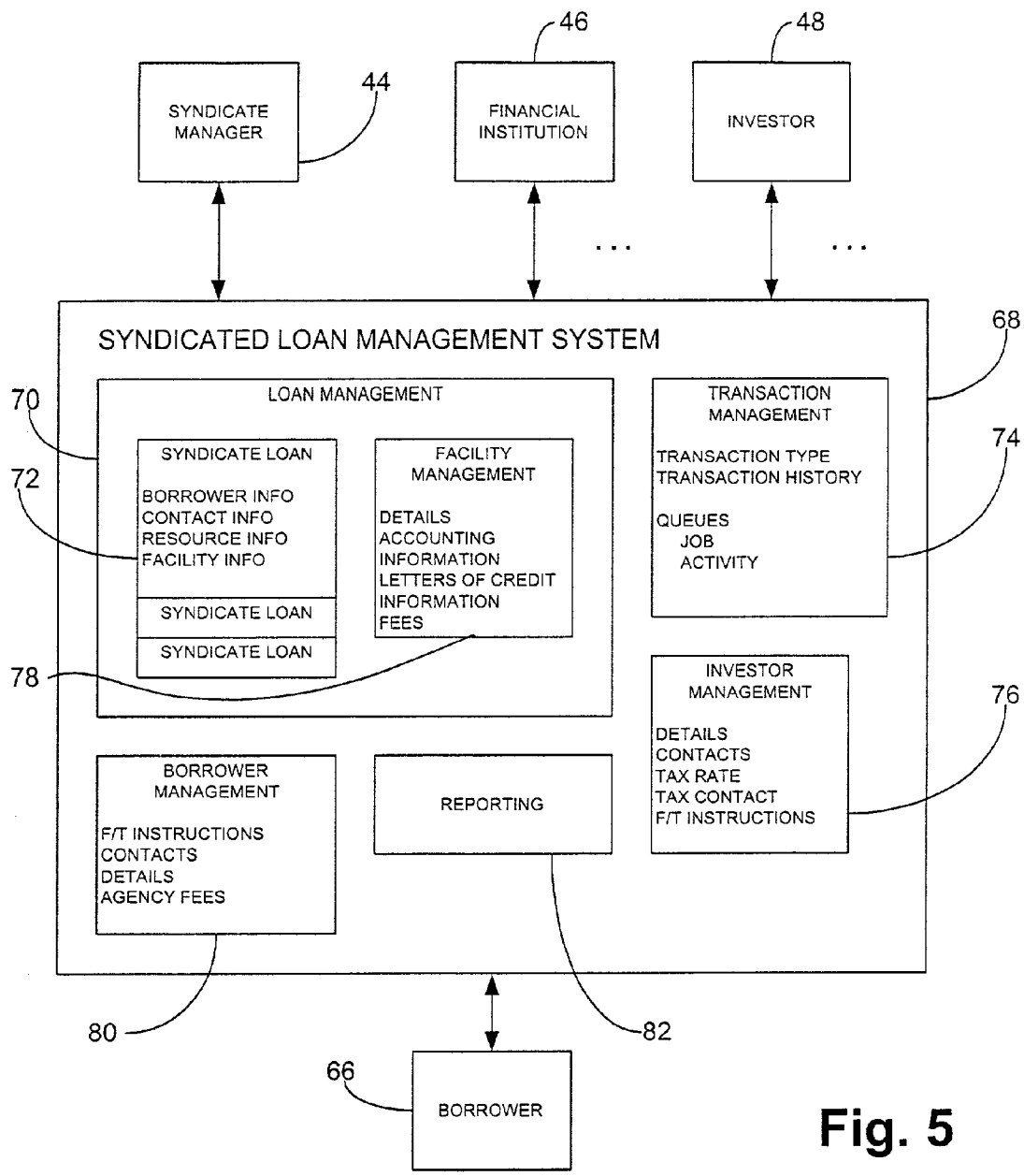
FIG. 5 is a diagram of components and entities according to the present invention.

Referring now to FIG. 5, a diagram of interaction between syndicate manager 44, investors 48 and borrower 66 through a syndicate loan management system 68 is shown. System 68 records and tracks information related to syndicate manager 44, investors 48 and borrower 66. System 68 also tracks information and status of the various loans, transactions related to the loans, and provides reporting mechanisms to collect and present information related to various syndicate loan aspects. The system according to the present invention can preferably access external systems as well. External system access can be used to obtain and correlate information related to the above-mentioned entities involved in the syndicate loan. The system is organized as a client-server type network based application, which is also linked to main frame systems, as indicated in FIG. 1. The system is multiuser and can access and manipulate information from a variety of sources.

System 68 provides a user interface 10 (FIG. 1) through which a user can access information related to any number of syndicated loans, or deals, through system 68 and manage information related to a variety of aspects of the deals. System 68 preferably includes tools for managing syndicate loan information, divided into various portions by subject matter. For example, portions such as a loan management 70, a transaction management 74, a borrower management 80 and an investor management 76, all contribute to overall system information handling. System 68 also manages a number of items related to various aspects of the syndicate loans. For example, contacts for investors 48 and borrower 66 are preferably maintained by system 68.

Individual deal status is available about a syndicate loan 72, for example, including information about pending transactions, approved transactions and processed transactions. New syndicate loans, or deals, can preferably be created using system 68 by first choosing a FNEN (financial entity) for the deal, and then entering information related to the transaction creating the syndication loan. Each deal preferably has a number of individuals with varying responsibilities assigned to review or manage the deal. For example, a typical deal includes a deal manager, a supervisor and an account manager. System 68 keeps track of the various individuals assigned to the various deals together with the transaction information involved in the deal.

Each deal has associated with it a borrower 66 for which borrower information is entered through borrower management 80. System 68 permits a user to access borrower management 80 through user interface 10 for viewing or manipulation. Borrower management 80 preferably includes general details, transactional instructions and contact and agency information. The agency information typically includes a schedule of fees for the agency. Critical borrower detail information in borrower management 80 can be modified by users with particular permissions. For example, the borrower name, tax ID and borrower registration information (U.S. & Registered Obligor) can be viewed or modified as needed, by a user given proper security permissions.

The borrower detail information can be input to borrower management 80 from other external systems that can interface with system 68. Information such as the borrower name, a primary address, country, an ID number, an obligor grade, a tax EIN (Employee Identification Number) and a SIC (Standard Industry Code), if available from an external system, can potentially be transferred to system 68, without the need for large expenditures in data entry resources. System 68 provides several tools, including search facilities, which can be used with many external systems. For example, a user can connect with an external system having information related to an investor or a borrower, using tools provided in the present system. The user can then perform searches or other operations to locate data that can be transferred to the present system, to provide information relative to a particular deal. Alternatively, system 68 can incorporate information derived from an external system in an electronic format, without the need for an actual connection.

Once borrower information is entered or selected in borrower management 80, an F/T (Funds Transfer) instruction, or multiple F/T instructions may be entered for a single borrower transaction in transaction management 74. An F/T instruction indicates the type of transfer to take place and specifies items such as terms for transfer of funds, amounts, parties, dates and so forth. A user can update the F/T instructions through user interface 10.

A "no F/T required" instruction is also available for entry and approval for each borrower. Once a F/T instruction is entered in system 68 through transaction management 74, an indicator such as "pending" or "approved" is shown for the F/T instruction details related to the particular borrower. When an F/T instruction is entered or updated, another individual with access permission to the F/T instruction preferably approves any changes, as opposed to the individual who entered or updated the F/T instruction. A different individual approves the F/T instruction than the individual that entered or updated the F/T instruction to provide a check on the procedure. When an F/T instruction is viewed in transaction management 74, the last user to modify the F/T instruction is displayed, in addition to the date on which the modification was made.

The details of an F/T instruction preferably includes a settlement-type, a clearing account number and a borrower account number. The F/T instruction details permits entry and tracking of a credit party, an account party or beneficiary information. Provision within transaction management 74 is made for an entry of a Fedwire (federal wire transaction) as an F/T instruction, which is listed as a book transfer with an appropriate DDA (Demand Deposit Account) number.

Borrower management 80 includes borrower detail information such as contact persons available on behalf of the borrower. The borrower contact information can contain any number of contacts at varying locations, together with descriptions of the particular contact person related to the transaction. For example, the borrower contact can be designated as a recipient of formal notices, a PMA (Portfolio Management Associate) or a bid contact.

The borrower detail information preferably includes a group of agency fees which can be viewed or modified, together with history/forecast information for the agency fees. The agency fee history/forecast information permits modification of the payment history and access to the next forecasted payment of an agency fee.

Borrower management 80 also includes a borrower fee schedule which can be viewed and modified. The borrower fee schedule includes history/forecast information which permits the fee payment history to be displayed, in addition to forecasted fee payments. In a preferred embodiment, the fee schedule includes a description, an effective date, a termination date, an annual fee amount, a billing cycle, i.e., annually, a billing day, i.e., the $17^{th}$ day of a month, and a billing type, i.e., in advance.

The borrower payment history and forecast is available for viewing and modification as well. The borrower payment history/forecast information preferably includes such items as the next payment due date, the previously paid date, the amount paid and the amount due.

Once borrower information has been entered for a particular deal, system 68 provides access to investor information through investor management 76, which includes information about various investor groups. An investor group can represent a single investor or a collection of investors operating as a unit. The investors can be financial institutions, asset managers for large funds, and so forth. Investor information is entered and tracked through system 68, and is viewable and modifiable by a user with proper permissions. The information supplied to investor management 76 for each investor or investor group preferably includes items such as general details, F/T instructions and contact information. Investor management 76 permits investors to be added or deleted, in addition to being placed in a group, or removed from a group. A search tool is available to locate a particular investor or investor group based on various criteria such as an investor name.

Investor management 76 further includes F/T instructions that contain information about a particular transaction. F/T instruction status is also available for display. A typical F/T instruction status may be approved or pending. The F/T instruction may not be deleted in investor management 76, but only viewed or updated, such as when its status changes. Only one F/T instruction can be entered for a given investor or investor group. The F/T instruction for the given investor can be approved only by a person with proper permissions, as long as that person is not the same user who last modified the F/T instruction, as described above. Once an F/T instruction is approved, the status of the instruction changes to approved, and is displayed by system 68. An F/T instruction can be updated with various changes and information such as settlement type, credit party, account party and beneficiary in addition to clearing and borrower accounts.

Investor management 76 also includes investor contact data, which is typically a list of individuals available at the investor location. These contacts are also available for grouping in user defined contact groups. In this way a user can access a customized contact list without having to go through a specific investor first. Investor contacts can be added, updated, viewed or deleted in the same way as previously described contacts. A user must have proper permissions to add, update or delete from the contact information. Preferably, the contact information includes such items as name, address, phone numbers in addition to a number of roles and responsibilities for the contact. When a contact is described as having a particular role or responsibility, the system will display appropriate fields which are preferably filled in according to the role or responsibility of the particular investor contact.

Contacts can be managed in general as well. For example, an individual user can select and update various contacts related to a particular deal or particular investors. In addition, groups of contacts can be defined by the user related to investors, borrowers, deals, and so forth. The user further has access to a predefined listing of contacts which is created automatically by assignment of roles and responsibilities mentioned above. Thus, new contacts can be added to the predefined contact listing simply by creating a borrower or investor contact with a particular role, or adding a particular role to an existing contact.

The user defined contact lists, including individual and group contacts, are created and maintained by the user at a level related to specific deals. Once a user defined contact list is accessed, the user may add, update and delete entries in the list, including individuals and groups. Again, the user may add or remove individuals to or from other groups. Once again the user must have proper permissions to manipulate contact lists for the various borrowers/investors, except where the list is defined by the user.

Another feature of loan management 70 is a facility maintenance 78, which includes details about various facilities that are a part of the deal transaction. Through facility maintenance 78, facility information can be added, updated and deleted. The facility information for a given deal preferably includes facility details, commercial loan accounting information, LC information, fee information and syndicate group information. Only users with permissions related to a selected deal can update, add and delete facilities and facility information through facility maintenance 78. However, all users can view the facility information available in facility maintenance 78. In addition, a facility preferably cannot be deleted from a deal until all transactions associated with the facility, other than closing, are deleted. This preventative measure ensures that no outstanding transactions remain before a facility is deleted.

Facility maintenance 78 permits users to add or update facility details, provided the user has proper permissions. Users without add or update permissions can still view the facility details, which may include external system information and details. For example, syndicate manager 44 may hold a number of assets or resources which may be available for commitment as facilities for a syndicate loan. If these assets or resources are tracked with another mechanism, such as a database application, system 68 can access the database to retrieve or update facility information for use in facility maintenance 78. Facility details are preferably accessed and displayed to provide a comparison for synchronizing data between system 68 and the database application system. In addition, access to the database application permits an automated comparison between the two systems. Any discrepancies found during automated synchronization, for example, are noted in a warning message box. Once the user is apprised of any discrepancies between the systems, they can take steps to synchronize the data accordingly. For example, if there is a discrepancy noted in the information of one of the systems, the user can choose which system or information to synchronize or can choose not to synchronize the systems. Information in facility maintenance 78, such as facility ID, description, opening facility amount, borrowing base amount, administration agent, reference bank and RRC (Regulatory Reporting Code) can all be updated. In addition, a user can update or add information related to credit agreements under a facility.

Information can be added or updated in facility maintenance 78 provided the user has proper permissions. All other users without add or update permission can only view the information through facility maintenance 78. The commercial loan accounting information accessible by users representing syndicate manager 44 reflects the share a particular financial institution has in the selected facility. The commercial loan accounting information is available for use with transaction details when a loan related transaction is prepared with respect to a selected facility. The commercial loan application information includes a borrower processing entry for the loan accounting system, a borrower account number, a commitment/line number, loan type, tax status and floating rate default. In addition, the information preferably includes whether draw downs under the selected facility will be secured or unsecured, and whether interest is payable on principal payments or on conversion/rollover, and provide a number of days in advance of a due date that a notice should be sent to a borrower.

The LC information is available from facility maintenance 78 as well. The LC information includes letter of credit amounts, accounts and fees, each of which can be viewed and updated by users with appropriate permissions for a selected facility. The LC information is also available for viewing by other users without the special permissions in facility maintenance 78. The LC information becomes pertinent when the credit agreement for the selected facility contains provisions regarding the letter of credit. The letter of credit information includes a maximum dollar amount for draw downs under the selected facility, a primary account number for use by the issuing agent, a secondary account number if the financial institution using the system is not the issuing agent and a letter of credit fee depending on the LC type. LC types include trade, standby and acceptance letters of credit.

Fee information for a particular facility is also available in facility maintenance 78. The type of fee is either a commitment fee or a facility fee, and only one fee for either type is preferably permitted by facility maintenance 78. The fee information can be added, updated and deleted depending upon the user's permissions. If a user has no modification permission, the information is still available for viewing. The commitment fee and facility fee information is used to process accruals for the selected facility. For each fee, the information preferably includes a fee rate and scale types, i.e., fixed and contingent, billing cycle, i.e., quarterly, billing type and day, and fee basis, i.e., a 360 day year.

Selecting a facility from facility maintenance 78 also makes available syndicate group information. A syndicate group display shows current and original syndicate group entities providing facility financing and includes distributions for the selected facilities among the entities. For example, a number of financial entities may provide the financial support for a given facility, as noted by their pro-rata share. Alternatively, a single entity may contribute several facilities. The original resource distribution for a given facility cannot be updated once entered, with the exception of a closing event for the selected facility.

The syndicate group information shows investor names and amounts of investment, including distributions and allocations of the facility resources available. The syndicate group information can be viewed according to a particular status through, for example, a filter. An entire syndicate group can be copied between facilities, under the same deal, for instance, and syndicate group members can be added or deleted. For each investor in the syndicate group, a pro-rata amount and a pro-rata percentage of the facility is available for viewing or updating. Copying a syndicate group can only be done by a user with appropriate permissions. Similarly, a syndicate member may only be added or deleted by a user with proper permissions. Facility maintenance 78 permits a set of investors to be listed along with a set of syndicate groups so that investors may be added or removed from the specified syndicate group in an intuitive manner. To facilitate an intuitive approach, a search may be conducted for an investor name to quickly locate the investor for addition or removal to/from a particular syndicate group.

Transaction management 74 is provided in system 68 for each syndicate loan transaction or deal. Transaction management 74 permits management of information related to deal/facility selection, transaction history, transaction initiation, job queue and activity queue. The deal/facility selection shows a list of all active deals, closed deals and individually customized selection of deals. The user can select an active deal to enable a transaction initiation. If the user selects a facility, the transaction history is enabled in addition to the transaction initiation. Transaction initiations are preferably enabled only if the user has proper permissions.

A view of transactions and facilities can be selected by choosing appropriate items from available filters. For example, a filter can display all deals, closed deals or customized deals.

Other filters can choose an organization through which the transactional facility is available. Each selected deal has associated with it a list of facilities available for the borrower. Transaction management 74 also provides for a search to locate a particular deal by deal name or a particular facility by facility ID. A transaction can be initiated only if the deal status is active. In addition, a borrower must be defined for the particular deal in the borrower detail information discussed above.

The current total pro-rata distribution among the syndicate members forming a syndicate group for a facility preferably adds up to 100%. The various distributions among syndicate group members can be verified through loan management 70 and facility maintenance 78 discussed above. Again, a user accessing the deal information must have proper permissions.

Once transaction settings have been made through transaction management 74, the transactions are processed with additional processing requirements and messages. Reports are generated from transaction processing such as F/T instruction reports, loan accounting forms, LC forms and so forth. A transaction can be saved prior to complete transactional processing to review deal/facility information. The deal/facility information that can be reviewed includes the requirements such as the borrower having at least one approved F/T instruction and at least one contact with a notification recipient flag. Each facility is preferably associated with at least one syndicate member for purposes of managing the facility. Each member of the syndicate group with a pro-rata amount greater than zero preferably has at least one contact with the notification recipient flag, in addition to an approved F/T instruction.

When syndicate manager 44 is a syndicate group member with a current pro-rata amount greater than zero, syndicate manager 44 preferably has at least one contact with a loan accounting notification recipient flag, loan department flag and an LC flag. In this situation, syndicate manager 44 also receives tax status information and secured/unsecured information with the loan accounting information. These various recordations depend upon whether the transactions create loan accounting forms when processed, or if an LC transaction is involved. That is, a syndicate group transaction in which syndicate manager 44 is listed as an investor will generate loan accounting forms and notices, while transactions involving letters of credit implicate LC department notification. A transaction initiated with a non-standard message in transaction management 74 preferably includes a definition of a borrower for the deal in the borrower detail information. Each member of the managed contacts for the deal preferably has a fax number in this instance, to permit automatic notification by facsimile.

If a deal/facility transaction is to be initiated with a non-standard message a borrower for the deal is preferably defined as discussed above, and the current total pro-rata distribution among the syndicate members preferably adds up to 100%. In addition, the facility preferably has at least one syndicate member included, each member of the syndicate group with a pro-rata distribution amount greater than zero preferably has an approved F/T instruction and each member of the syndicate group preferably has a fax number. Each of these checks on a transaction prior to processing helps to ensure that the transaction processing actions will occur without errors.

Where a deal/facility is initiated by an agent other than syndicate manager 44, further requirements are preferably in place. The deal status must be active in syndicate loan 72, and a borrower must be defined in borrower management 80. Again, the current total pro-rata distribution among the syndicate group members must add up to 100%. In addition, access to the deal is granted only to persons with appropriate permissions, such as a manager, supervisor or current account manager assigned to the deal.

Once a deal is initiated, additional transaction processing requirements must be met. For example, the borrower must have at least one approved F/T instruction listed in borrower management 80, and the facility must have at least one syndicate member in facility maintenance 78. When syndicate manager 44 is a syndicate member with a current pro-rata amount greater than zero, at least one contact with a loan accounting forms recipient flag is preferably listed. The investor information preferably has at least one contact with a loan department flag and an LC department flag, tax status information and secured/unsecured information provided in the loan accounting information. When the above criteria is not satisfied, the user is informed through a message that the transaction was saved but not processed and the criteria that was not satisfied is indicated. The user may then modify the transaction information to satisfy the criteria, and resubmit the transaction for processing. Once all the criteria are met for transaction processing, the processing job is submitted for batch processing and appropriate outputs such as F/T instructions, loan accounting forms, LC forms and other reports are generated.

The history of a particular transaction can be viewed through transaction management 74 as well. A list of transactions is displayed by transaction management 74 upon user request from which the user can select and view a particular transaction. The transaction history can be updated for transactions that have not been processed or that have been processed with a current status of canceled for any one of related messages, F/T instructions and loan accounting forms. Again, the update feature in transaction management 74 is only available if the user has proper permissions. Deletion of a transaction from the transaction history is possible if the transaction has not been processed, or if the transaction has been processed and the current status of the messages, F/T instructions and loan accounting show "canceled". Cancellation can only occur if the user has proper permissions. The transaction history feature also has an activity display which shows transactions placed in an activity queue.

Initiation of a transaction in transaction management 74 can occur after an active deal/facility is selected. A special form transaction referred to as a non-standard message transaction can be initiated if an active deal is selected without a facility. Only users with appropriate permissions assigned to the particular deal can initiate a transaction. The user selects a transaction type and is prompted for appropriate information related to that transaction. Referring to FIG. 2, transaction types that can be selected in transaction management menu 36 include new draw down, rate setting, additional draw down, pay down with interest, pay down without interest, fee or interest accrual, maturity/conversion/rollover, non-standard message, note or fee rate parameter change, syndicate/participation sales, syndicate/participation sales change, facility amount change, memo and reference bank change. Selection of any of these types of transactions prompts the system to display to the user an appropriate feature for the selected transaction. For example, if the selected transaction is a new draw down, additional draw down, pay down with interest, or pay down without interest, a pricing type selection is displayed.

Pricing types vary among the particular transaction types for which a pricing type selection may be made. In addition, all pricing types are not preferably available for all transactions. As an example, the user may select a transaction type of "new draw down" and a pricing type of ABR (Alternate Base Rate, derived as an alternate with the prime rate at a reference bank). The user can then enter the transaction effective date, which prompts the display of facility information related to the transaction. A unique transaction sequence number is displayed for the transaction and pertinent fields are enabled for entry of information related to the transaction. Alternatively, the field values are drawn automatically from facility or deal information or may be filled in with default values. Information related to the financing of the transaction can be entered or updated, including parameters of the note, interest rate, accruing and billing information, loan accounting information and F/T information.

When the transaction type is initiated as an additional draw down for example, and a pricing type is selected for the transaction, entry of a valid transaction effective date prompts a display of fund amounts in the facility information. Current facility amounts, loan outstanding amounts, LC outstanding amounts, and any other outstanding amounts are shown, in addition to displaying available facility amounts. A unique transaction sequence number is displayed for the transaction effective date and notes eligible for inclusion in the additional draw down can be selected and reviewed. Once a note ID is selected, parameters related to the note can be entered, viewed or updated as required to complete the transaction information.

When the transaction initiated is a pay down without interest transaction, operations similar to those described above occur. For instance, entry of a valid transaction effective date preferably displays facility information amounts, a unique transaction sequence number assignment, in addition to enabling the selection of notes eligible for the transaction. Once a note ID is selected for this transaction, pertinent information related to the note can be entered, reviewed or updated.

Similarly, a transaction initiated as a pay down with interest produces a display of facility amount information, assignment of a unique transaction sequence number, and permits selection of eligible notes for information entry, review or update. Again, a valid transaction effective day is preferably entered, and a note is selected by a note ID for modification according to the transaction.

An MCR (maturity/conversion/rollover) transaction typically has a number of parameters that are preferably entered or evaluated. Once a valid transaction effective date is entered for a selected maturity/conversion rollover transaction, facility information amounts and a unique transaction sequence number assignment are displayed along with notes eligible for maturity/conversion. Note IDs which are not to be included in the transaction can be selected and removed and will no longer be displayed in the note ID panel. New borrowing amount information is updated in the maturity/conversion information by selecting an update feature with a particular note being selected. In addition, new loan information can be updated when a new note is selected for update from the new note list. When a particular maturity/conversion note or a new note from the new list is selected, the related information becomes available for update. The information which can be updated includes the C/R (Conversion/Rollover) amount, pay down amount and/or dates from which interest is accrued. In addition, loan accounting information related to the selected note can be reviewed and updated. A new note can also be credited in the new note list. The user simply selects a new note feature, which prompts a selection of a pricing type, as described above. Once the user selects a pricing type, parameters for a new note can be entered or updated, including interest rate, accrual, billing and loan accounting information. A new note has a note ID, a principal amount, a C/R from ABR and a loan type, such as a time receivable type loan.

In the MCR display, notes can be selected for maturity/conversion/rollover by choosing a note selection feature. The note selection feature, once chosen, displays a pricing types screen, as discussed above. Selection of a pricing type displays a list of notes eligible for MCR under the selected pricing type. Notes eligible for MCR can be selected according to note ID, and the user can confirm the correct note will be increased by reviewing the note details such as outstanding amounts, borrow amounts, reprice dates and so forth. The user can also review the note interest information and update the interest and billing information as desired.

The parameters for the note eligible for MCR, such as borrow amount and conversion/rollover amount, can be entered or updated. Loan accounting information can be reviewed or updated as needed. Once all the information is entered or updated, the user is returned to the MCR display, and the note information just entered is displayed, which permits the user to verify the note information.

Transaction initiation displays are similar for the fee or interest accrual transaction type, when the pricing type is for a commitment fee or facility fee. The transaction receives a unique transaction sequence number upon entry of a valid transaction effective date. The user can enter, review or update note parameters and loan accounting information on the resulting display screen, in addition to fund transfer information.

When the transaction type initiated is fee or interest accrual and the pricing type selected is interest on alternate base rate, certificate of deposit, LIBOR (London Interbank Offered Rate—Borrowing where interest is accrued based on a LIBOR Rate), money market or Fed funds, the user is presented with the appropriate information fields for the transaction. Again, the user must enter a valid transaction effective date to receive a unique transaction sequence number and to permit selection of notes eligible for the transaction. The user can select a note for the interest accrual and enter, review or update note parameters, interest information, loan accounting information and F/T instruction information.

Another pricing type associated with the transaction type of fee or interest accrual is LC commission fee or LC issuer fee. For this pricing type the user enters a valid transaction effective date to receive a unique transaction sequence number and to permit selection of notes eligible for the transaction. The user can select a note eligible for the LC commission fee or LC issuer fee and enter, review or update parameters for the note, as well as information on the LC, commission fee, issuer fee and F/T instruction.

Another transaction type is syndicate/participant sales, which reflects a transfer in ownership of notes making up a given syndicate loan. Entry of a valid transaction effective date permits assignment of a unique transaction sequence number, access to a sale type entry, and a display of notes eligible for break funding. The user can select a sale type, for example participants sales, to enable selection of a seller and a buyer. Once a seller and a buyer is selected, the appropriate information from each of the parties is automatically displayed such as syndicate share and pre- and post-sale syndicate loan amounts. The user can enter, review or update further information, such as skim and break funding rates as required.

A skim rate can be added, updated or deleted by the user from this screen display. A pricing type, for example certificate of deposit, can be selected for each particular skim rate to be added, and the skim rate can be entered through a dialog box. Skim rates can also be updated or deleted based on user selection for the syndicate/participant sale.

Break funding rates displays are preferably available only in this type of transaction when there are existing match-funded notes under the facility. An eligible note ID is selected and an update option is selected for that note. The break funding rate and buyer rate for the selected note can be viewed and updated.

Another transaction type available for syndicate/participant sales transactions is a change in sale amount. Selection of this type of transaction presents display that contains information related to a sale ID, sale type, buyer and seller. The transaction is initiated by entering a valid transaction effective date, which causes display of a unique transaction sequence number while providing access to a list of sale IDs. The user can select the sale ID to display a sale type, and buyer and seller information. The user can then enter an increase/decrease amount to be changed in the current sale amount to produce a new sale amount.

When the transaction type is a facility amount change, the user can modify the current facility amount through the transaction. Entry of a valid transaction effective date permits display of facility amounts, the assignment of a unique transaction sequence number and enables modification of fields that can be changed for the transaction. The user can view global facility information to ensure the change desired can be accomplished. An increase/decrease amount is entered under the transaction, and the user can review the loan accounting information related to the facility.

A transaction initiated for interest or LC commission fee parameter change is permitted upon entry of a valid transaction effective date. With a valid date, the system assigns a unique transaction sequence number and allows the user to select from among notes eligible for use in the transaction. Once an eligible note is selected by the user, the LC commission fee parameters can be entered, reviewed or updated. The parameters include such items as fee rate and billing information.

If the initiated transaction is for a commitment or a facility fee parameter change, the user preferably enters a valid transaction effective date. Upon entry of a valid date, a unique transaction sequence number is assigned and the user has access to enter, review or update parameters related to commitment or facility fees. Parameters found in this transaction include fee information such as accrual basis and types, cycles and days for billing.

The system also permits a transaction type for a memorandum. The user preferably enters a valid transaction effective date to obtain unique transaction sequence number and to enter a message in a transaction history window display portion.

A user can also initiate a transaction for a non-standard message at the deal level. The user selects an active deal and chooses a transaction type of non-standard message. Once the user selects a valid transaction effective date, the managed contact group list box is enabled. A managed contact group can then be selected, which enables a message output selection list and a template name selection list. The message output selection can be either a group or individuals within the group. The user can also select a template from among the template names in the list to provide the non-standard message. The user can then enter, review or update text within the message, with changes to the standard format indicating that the message is non-standard format.

When the user selects an active deal and initiates a transaction type for a non-standard message, the user can essentially send a freeform message which can be based on a message template or simply the user's own comments. A file look-up feature is available that permits the user to insert a text file as the non-standard message. The user can edit and print the message before saving and processing the transaction.

When an active deal and particular facility associated with the deal is selected and a non-standard message transaction is initiated by the user, information on distributions and F/T instructions also become available. The user must enter a valid transaction effective date to receive a unique transaction sequence number and enable the managed contact group list. The user selects a managed contact group from the list that is to receive the nonstandard message and chooses to send the message either to the group or to individual investors. A message sent to an investor allows a different message to be sent to selected investors in the group. A message template is selected by choosing a template name from a list, and the user may edit and review the message text for a selected template.

The message preferably includes placemarkers for distribution information about distribution amounts and dates, in addition to F/T instruction information related to the transaction. Using this feature, the message template can be reviewed, modified and updated by the user, to have distribution amounts and F/T instruction information automatically inserted in the placemarkers. The distribution amount information includes a distribution date and revenue or non-revenue amounts. Distribution information also includes an update feature which is enabled when a distribution amount is greater than zero. Selecting the update feature for the distribution amounts permits the user to select various investors related to the transaction and update a distribution amount as of a particular date.

For transaction processing when the transaction or pricing type selected is loan related, a loan accounting information feature is made available. In particular, this feature is enabled when syndicate manager 44 is a syndicate group member listed in a facility associated with the deal with a current pro-rata portion greater than zero. The loan accounting information feature is used by syndicate manager 44 for tracking loan transaction information and loan accounting. For example, if the transaction is a new draw down transaction, the information in the loan accounting feature will automatically default to loan accounting information related to syndicate manager 44 for the selected facility. The default information related to syndicate manager 44 populated in the display can be overridden by selecting a value from list enabled fields or by entering data. Some field values in this area of transaction processing are not filled in with defaults, but are preferably entered by the user. The user can generally simply select from a list to fill in the field or enter a new value. Since a borrower may have multiple accounts with available loan accounting information maintained by syndicate manager 44, the user can select each account and make appropriate field entries, or accept default values as described above. The loan accounting information parameters include a processing unit such as a bank, an account number, a commitment/line number and a note number, all of which can be entered, reviewed or updated by the user with appropriate permissions.

The F/T instruction information for the transaction being processed is also enabled for user access once a valid transaction effective date is entered in the transaction detail information. A default value date for the F/T instruction information is presented to the user for review or update. The user can then select an approved borrower F/T instruction from a list of F/T instructions. The user can review the clearing and borrower accounts, payment details and bank information for the selected F/T instruction to insure that the proper F/T instruction was selected for the transaction. Payment detail information can be updated as needed by the user.

When the combination of transaction and pricing type involves a letter of credit, LC information, LC commission fee information, issuer fee information and reevaluation information is made available for entry from the transaction detail feature. This information is made available once a valid transaction effective date has been entered in the transaction detail information. Entries such as, for example, the commission fee information are made or reviewed by the user. The user enters a fee rate as a percentage, and selects an accrual basis, billing type, cycle, month and day for billing.

The reevaluation information for the letter of credit is enabled when the issuance currency in the transaction detail information is in a currency other than U.S. dollars. The user can select the reevaluation cycle, i.e., quarterly, a series of months and a day on which the reevaluation is to occur, and updates the information as needed.

When the combination of transaction and pricing type selection allows messages to be generated, the user can select to add an extra message in the transaction details. This feature is preferably enabled when a valid transaction effective date has been entered in the transaction detail information. Once the user gains access to entry of an extra text message, the text data can be printed, or can be inserted from a file. Some automatic features are available so that text can be automatically inserted in the extra message text, for example, a spreader report, which is preferably available for pay down with interest, fee or interest accrual and maturity/conversion/rollover type transactions. If the user wishes to select a file to input to the message screen, a directory feature is made available for the user to navigate among various directories and select a file for entry in the text input area.

During transaction processing, the user can also view a history of the transaction details from the transaction detail information. The feature of viewing the transaction history is always available, except when the user has navigated to the deal level non-standard message transaction feature. When the transaction history is accessed, the user is presented with a list of transactions, through which the user can scroll and view information regarding previous transactions.

Once all the information for a transaction has been entered in the transaction detail information, the user can save the transaction for processing. Saved transactions are processed for validity and checks on various parameters. If the transaction saved is a non-standard message transaction, no validation preferably takes place. As an example, a transaction save preferably ensures a valid transaction effective date has been entered in the transaction detail information.

System 68 also features a save and process function which is available through transaction management 74. The save and process function is available once a valid transaction effective date has been entered in the transaction detail information. By selecting the save and process function, transaction detail information is submitted to application server 20 (FIG. 1) for editing and validation before it is saved in the database. Once the transaction detail information passes all edits and validation criteria, it is submitted for transaction review. If the transaction criteria is met in the transaction review, the transaction data is committed to the relevant tables in relational database 26 (FIG. 1). Saving the transaction, however, preferably does not create any F/T instructions, messages, loan accounting forms or reports. If the transaction requirements are not met, a message is displayed to the user confirming that the transaction has been saved, but cannot be processed because of erroneous or missing information. The user can then correct the information for the transaction and resubmit the transaction detail information for processing. Again, if the transaction review is successful the user is permitted to either initiate another transaction, or go to the activity queue feature in transaction management 74 or the deal/facility selection information in deal management 70.

Another feature available under transaction management 74 is a job queue. The job queue displays a list of job IDs related to transactions which have been submitted for processing. A user selecting a job queue to view will only see job IDs related to transactions which the user is authorized to view. For example, a supervisor or a manager can view all job IDs for their default organization such as the bank they represent. The user can select a particular item in the job queue to obtain more information about the transaction related to the selected job ID. The information displayed for each transaction is the job ID, deal name, the time submitted, the user submitting the transaction, the start time, the end time, execution time, job status, current account manager, facility ID, transaction description and activity ID. The queue feature also permits the user to access a log for a particular transaction related to a given job ID. Once the log is accessed, it can be printed or saved according to selections made by the user. The user may also select a transaction by job ID for cancellation. Preferably, only jobs which have status of waiting or executing can be cancelled by the user. The job queue feature also permits the user to select a transaction by job ID to review the activity queue for the transaction.

When the user selects the activity queue for a given submitted transaction, a number of activity IDs are displayed. Again, the activity IDs that are displayed to the user will depend upon the user's permissions. Supervisors or managers can view activity IDs with a Value Date greater than or equal to the present date and no more than eight days less than the present date. If the user is an account manager, the activity IDs for the deals for which the account manager is the current account manager will be displayed when the date value is greater than or equal to the present date. Activity IDs will only be displayed if the current status of the message or F/T instruction is new or approved. When reviewing the permitted activity ID information, the FNEN displayed is for the default organization or banking institution. The activity IDs can be selected by a filter which depends upon the user's authorizations. The user can access different lists of activity IDs based on updates to the FNEN and/or filter. Once a list of activity IDs is displayed, the user can scroll down the list to select a particular activity ID, or enter a particular activity ID in a search input to locate the activity ID.

The activity queue display permits the user to modify the message or loan accounting information form for the activity, provided that the current status of the activity is new. By selecting the modify function, the user can change the message or loan accounting information form as desired. Once modified, the user can print or save the message or loan accounting information form with the changes.

The activity queue preferably provides a save feature for saving messages, F/T instructions, loan accounting system forms or reports in a file. Once accessed, the save feature provides the user with a directory navigation display to permit file saves in a location specified by the user.

The activity queue also preferably provides a feature for approving the activity, provided the messages and loan accounting system forms have a status of new, and the user has proper permissions. The F/T instruction preferably cannot be approved by the same person by which it was created. By selecting the approved feature, the user's name and the present date and time are displayed in a status tracking field for acceptance by the user to confirm approval.

For activities with a current status of approved, the user has the option of selecting a release feature. However, this feature is preferably enabled only for F/T instructions if the current status is approved, and the user is a quality assurance manager. Once the activity is released, the appropriate message or loan accounting system form is sent to a fax server and the F/T instruction is prepared to be sent to an FTPC (Funds Transfer PC). The user preferably checks that the status of the message is TRN (in Transit for fax delivery) and that the user's name and the present date and time are entered in the status tracking field.

In addition, an entry in the activity queue can be cancelled for messages, F/T instructions and loan accounting information forms with a status of "new". Again, the user must have proper permissions to be able to cancel the activity. The status of the message, F/T instruction or loan accounting information form for the activity ID must be cancelled before the transaction can be updated, deleted or reprocessed. When the cancel feature is selected, the user's name and the date and time of cancellation is preferably recorded for tracking and auditing purposes.

A user with proper permissions, for example a supervisor or a manager, can override the status of the message, F/T instruction and loan accounting information forms regardless of the current status of the output. Again, the user instituting the override preferably has their name and the present date and time displayed in the status tracking field, along with the new status provided by the override, for tracking and recordation.

There is also a feature to print the information contained in any activity at the user's option. When printing is selected, the user can choose from among various properties for customized printing. Such printing options include items like paper size, paper source and so forth.

Investor management 76 provides a utility feature to manage such features as investors and their details, prime rates, tax information and templates. While all users may view the investor information, only managers are permitted to add to or update the information. Investors can be selected from a list by entering an investor ID, or the deal name associated with the investor. The user can also search for an investor or deal name by entering all or portions of the information into a search function to locate the investor or deal name. Once an investor or deal name is selected, details about the investor are available for viewing. For entry of a new investor, the user must be a manager, which permits the user to enter detail information about the investor. Investor information can be obtained from external systems connectable to system 68, and then updated by name, address, tax data and F/T instruction data, as needed. The external system information can be selected by a customer ID number or by name. In addition, the user can search for the customer by entering all or portions of the customer ID number or customer name. The external system customer information can be displayed to the user in a scrolled format when available, so that the user can select from a number of customers. The user can also verify that the correct external system customer is selected by viewing details about the chosen customer in the external system.

The prime rate for an investor can be viewed once an investor is selected by any user. However, only managers can preferably add a new prime rate for the investor, or update an existing rate.

Another feature of investor management 76 is maintenance of templates. Each deal has associated with it a number of standard templates which can be accessed and modified. For example, a user with proper permissions can add, update, view or delete a template containing information used repetitively or with little change. Templates are organized by FNEN, to indicate the appropriate banking institution. The user can also select a deal name to display a list of the templates associated with a given deal. Various standard entries may be made in the templates by inserting codes related to the desired information. For example, an investor's pro-rata share can be inserted automatically into the template by providing an appropriate automated code in the body of the template. The user may also insert an entire file into the template and save or print the entire new or updated template.

System 68 also provides a function for reporting 82, which gives the user access to a number of reports on reports server 22, based on particular categories. For example, a report can be generated through reporting 82 that is related to the deal, borrower, investor, facility or transaction, or to miscellaneous, user selected information. Once a report is selected, it can be generated for review, and the user can enter or update parameters in the report. If an error occurs during entry or update of the report parameters, an error message is displayed and the user may correct the parameters and resubmit a report request. Once a report is generated through reports server 22, it can be viewed by the user with the selection of a view report feature.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A computer-implemented client server-based loan management system for facilitating management of syndicate loans for a syndicate manager, each syndicate loan made to a borrower by a corresponding syndicate group including at least one investor, the system comprising:
   a borrower interface enabling borrower access to the system over a communication network;
   a borrower management module accessible via the borrower interface and storing therein borrower information including at least borrower contact information, funds transfer instructions, and a borrower fee schedule, the borrower management module including instructions executed by a processing system for managing the borrower information;
   an investor interface enabling investor access to the system over a communication network;
   an investor management module accessible via the investor interface and storing therein investor information including at least investor contact information, funds transfer instructions, and tax information, the investor management module including instructions executed by the processing system for managing the investor information;
   a transaction management module for maintaining information corresponding to particular transactions, the transaction management module including instructions executed by the processing system for managing the information corresponding to particular transactions;
   a loan management module comprising a syndicate loan sub-module and a facility management sub-module, wherein the syndicate loan sub-module stores information corresponding to a plurality of different syndicate loans and the facility management module stores information corresponding to a plurality of different credit facilities, each credit facility corresponding to at least one syndicate loan and at least one borrower, the loan management module including instructions executed by the processing system upon receiving a credit facility selection for identifying and retrieving information pertaining to a corresponding syndicate loan;
   a report module in communication with the loan management module, the transaction management module, the borrower management module and the investor management module, the report module implemented by the processing system to generate reports related to selected parameters; and
   a syndicate manager interface enabling syndicate manager access to the system.

2. A loan management system according to claim 1, further comprising:
   a loan portion ownership transfer module operable to inform investors in said loan management system of a first investor offering a loan portion for at least one of a sale and a trade;
   said loan portion ownership transfer module being further operable to consummate said at least one of said sale and said trade, whereby recordation of a transfer of said loan portion ownership is made in said loan management system;
   and said transfer module is further operable to notify said first investor and an other party to said transfer of consummation of said transfer.

3. A loan management system according to claim 1, further comprising a business logic module including stored criteria for determining if parameters of a transaction are within appropriate value ranges, wherein said business logic is operable to receive and analyze a transaction request from said user through said user interface and operable to approve said transaction request based on said criteria.

4. A loan management system according to claim 1, wherein the investor management module further comprises:
   a set of funds transfer instructions for each of said plurality of investors;
   and each of said funds transfer instructions having a status indicative of whether said funds transfer instructions are pending or approved.

5. A loan management system according to claim 1, further comprising:
   an agent fee calculation module operable to calculate an agent fee;
   and said agent fee related to at least one of transactions for and amounts of said loan resources.

6. A loan management system according to claim 1, further comprising:
   a user access authorization module;
   and an access authorization level assigned to said user, whereby said user is granted access to various portions of said loan management system based on authorization accorded to said user by said user access authorization module determined by said access authorization level.

7. A loan management system according to claim 1, further comprising a contact list including contacts for said plurality of investors and for said at least one borrower.

8. A loan management system according to claim 1, further comprising:

an external data system coupled to the loan management system, wherein a user can provide instructions to loan management system through said user interface module to access said external data system;

and said access to said external data system can be used to compare said loan information with external data, and import and export data to and from the loan management system.

9. A loan management system according to claim 1, wherein the loan management system is operable to generate messages to at least one of said plurality of investors, said at least one borrower and at least one contact related to said plurality of loan resources.

10. A loan management system according to claim 9, wherein said generated messages must be approved and released for transmission by a user having approval and release authorization.

11. A loan management system according to claim 10, wherein said generated messages contain all information needed to initiate a loan for use as one of said plurality of loan resources.

* * * * *

UNITED STATES PATENT AND TRADEMARK OFFICE
CERTIFICATE OF CORRECTION

PATENT NO. : 7,599,879 B2  Page 1 of 1
APPLICATION NO. : 09/814243
DATED : October 6, 2009
INVENTOR(S) : Louie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1785 days.

Signed and Sealed this

Twenty-eighth Day of September, 2010

David J. Kappos
*Director of the United States Patent and Trademark Office*